E. J. ESTEY.
DEMOUNTABLE RIM.
APPLICATION FILED JUNE 6, 1910.
974,251.
Patented Nov. 1, 1910.
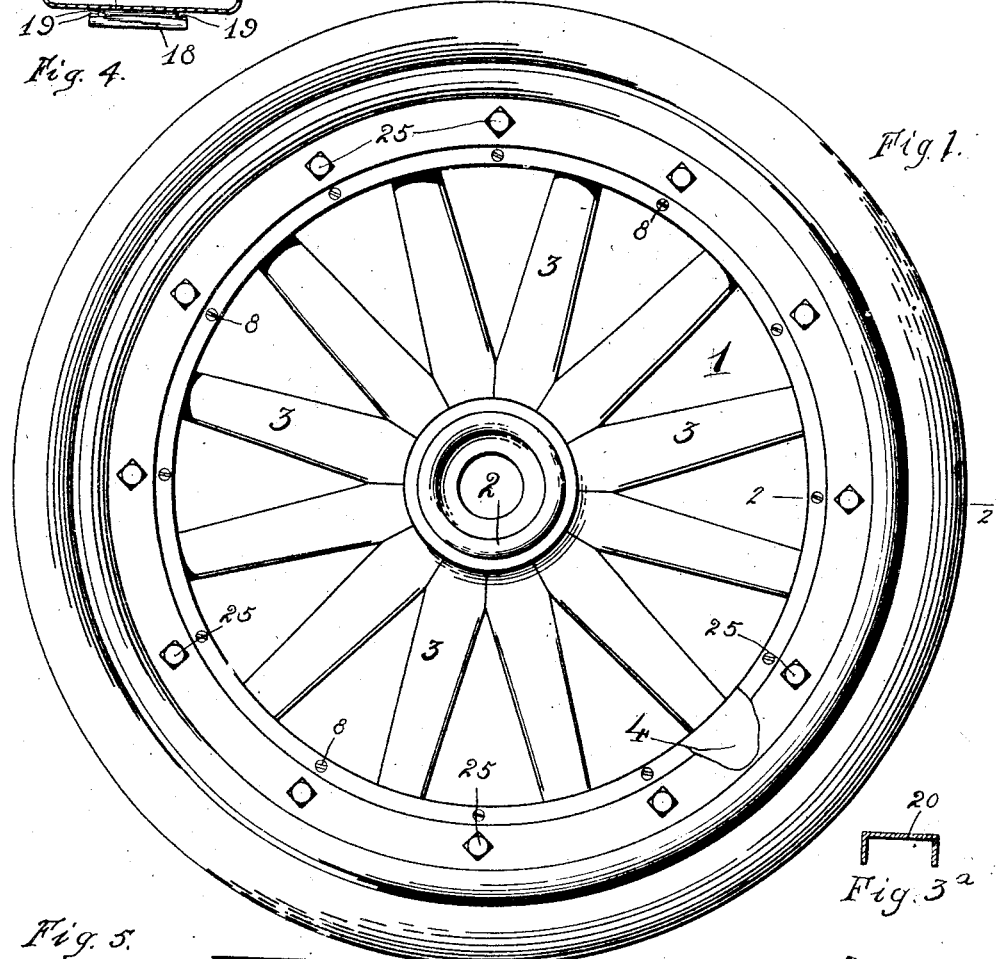

UNITED STATES PATENT OFFICE.

EDMUND JOSEPH ESTEY, OF APPONAUG, RHODE ISLAND.

DEMOUNTABLE RIM.

974,251.  Specification of Letters Patent.  Patented Nov. 1, 1910.

Application filed June 6, 1910. Serial No. 565,185.

*To all whom it may concern:*

Be it known that I, EDMUND JOSEPH ESTEY, a citizen of the United States, residing at Apponaug, in the county of Kent and State of Rhode Island, have invented certain new and useful Improvements in Demountable Rims, of which the following is a specification.

My invention relates to means for removably securing a tire to a wheel.

In carrying out my invention, I provide the felly of a wheel with a permanent rim, a demountable rim to be secured to the tire and removably arranged upon the permanent rim, and novel means to lock the permanent and demountable rims together.

The object of this invention is to provide means of the above character which are simple in construction, positive in their operation and cheap to manufacture.

In the accompanying drawings forming a part of this specification, and in which like numerals designate like parts throughout the same, Figure 1 is a side view of a wheel equipped with my tire holding means. Fig. 2 is a cross sectional view taken on the line 2—2 of Fig. 1. Fig. 3 is a perspective view of one of the keys used in my device. Fig. 3ª is a cross sectional view taken on line 3ª—3ª of Fig. 3. Fig. 4 is a side view of one of the locking lugs, showing the demountable rim in cross-section. Fig. 5 is a fragmentary top plan view of the permanent rim, the demountable rim being removed. Fig. 6 is a side view of Fig. 5.

In the drawings, wherein is illustrated a preferred embodiment of my invention, the numeral 1 designates, as a whole, a wheel, comprising a hub 2, from which radiate spokes 3, which in turn are suitably secured with a wooden felly 4.

The numeral 5 designates a permanent rim, which is disposed upon the periphery of the felly 4, as clearly illustrated in Fig. 2.
This permanent rim has one edge thereof bent to form an annular portion 6, which is curved in cross-section as shown. The opposite edge of the rim 5 is bent inwardly to form an annular section 7, which engages one side of the felly 4 and is secured thereto by screws 8, or any suitable means. An annular section 9 is disposed upon the opposite side of the felly 4 and is connected with the permanent rim 5, as shown at 10. The union of the section 9 with the rim 5, is effected after said rim has been placed upon the felly, and such union is accomplished by any suitable means. The annular section 9 is secured upon the felly 4, by means of screws 11, or the like. The felly 4 is provided at spaced intervals with a plurality of recesses or pockets 12, which are preferably rectangular and extend through periphery of said felly (see Figs. 2 and 5). The permanent rim 5 extends across each of the recesses or pockets 12, and is provided with an L-shaped slot 13, having communication with the pocket 12. The annular section 7 is also provided with an opening 14 which merges into the slot 13, and communicates with the pocket 12.

A demountable rim 15 is provided to coöperate with the members above described, and the same has its edges bent, as shown at 16, to receive and hold a portion of a pneumatic tire 17. This demountable rim is connected with the tire 17, and removably mounted upon the permanent rim 5. The demountable rim 15 has fixedly secured thereto, a plurality of spaced inwardly extending locking lugs 18, corresponding in number to the slots 13. Each of the locking lugs 18 is under-cut along its ends and one side, as shown at 19, to fit within the L-shaped slot 13, as clearly illustrated in Fig. 5. Keys 20 are fixedly mounted at spaced intervals upon a removable ring 21, which has its outer edge curved, as shown at 22. This ring is arranged upon the annular portion 7, and coöperates with the bent portion 6 of the permanent rim, to hold the rim 15 upon said permanent rim. Each of the keys 20, is U-shaped in cross-section and adapted for insertion through one of the openings 14 to occupy a position within the pocket 12, to confine the lug 18 within the slot 13, so that said lug engages the wall 23 of the slot 13. When this lug is thus confined within the slot 13, the rim 15 cannot be removed from the permanent rim 5. The removable ring 21 is provided with a plurality of openings 24, to receive therethrough bolts 25, having their inner ends screw threaded, as shown at 26. There is a corresponding number of bolts 25 and keys 20, and each of the bolts is arranged within one of these keys, as clearly illustrated in Fig. 2. The annular section 9 is provided with a plurality of lugs 27, one of which is disposed within each of the pockets 12. This lug is fixedly secured upon the annular section 9 by any suitable means. Each of the lugs 27 is provided with a screw threaded opening 28, to receive the screw threaded end of the bolt 25. The lug 27 is further provided with a frusto-conical opening 29, which leads into the screw threaded opening 28, for the purpose of directing the bolt 25 into said screw threaded opening.

In the use of my device, the permanent rim 5 is first secured to the felly 4, as above described, and the annular sections 7 and 9 are also connected with said felly by means of the screw, or the like. The demountable rim 15 is secured upon the tire 17, in the usual manner, and said demountable rim is then slipped upon the permanent rim 5. The rim 15 is then given a partial rotation, whereby each of the locking lugs 19, will assume the position within the slot 13, as clearly illustrated in Fig. 5. The ring 21 is then positioned upon the annular section 6, whereby one of the keys 20 will be inserted within the pocket 12, to retain the lug in the position shown in Fig. 5. The ring 21 is removably held in place, by means of the bolts 25. It is thus seen that the tire 17 is permanently held upon the wheel 1, and may be easily removed, for the purpose of repair or the substitution of a new tire equipped with one of the rims 15.

I wish it understood that the form of my invention herewith shown and described, is to be taken as a preferred example of the same, and that certain changes in the shape, size, and arrangement of parts, may be resorted to without departing from the spirit of my invention, or the scope of the subjoined claims.

Having thus fully described my invention what I claim as new and desire to secure by Letters Patent, is:—

1. The combination with the felly of a wheel, of a rim permanently secured upon said felly and provided with an edge curved in cross-section, said felly being provided with a plurality of pockets, said rim being provided with a corresponding number of slots having communication with said pockets, a demountable rim provided with edges curved in cross-section to hold a tire, said demountable rim being adapted to be removably arranged upon said first named rim, a plurality of lugs connected with said demountable rim for insertion within said slots, each of said lugs having portions thereof under-cut to lock with the walls of the slot, a ring to be detachably connected with said felly, and a plurality of keys rigidly mounted upon said ring for insertion within said pocket, to confine said lugs within one end of said slots.

2. The combination with the felly of a wheel, of a rim permanently upon the same, and provided with a plurality of approximately L-shaped slots, said felly being provided with a corresponding number of pockets in registration with said slots, a demountable rim for arrangement upon said first named rim and to hold a tire, said demountable rim being provided with a plurality of lugs having their ends and sides under-cut, a ring to be removably arranged upon said felly, a plurality of keys rigidly mounted upon said ring, a plurality of bolts to hold said ring upon said felly, and a plurality of fixed lugs provided with screw threaded openings to coöperate with said bolts.

In testimony whereof I affix my signature in presence of two witnesses.

EDMUND JOSEPH ESTEY.

Witnesses:
 HARRY WILDE,
 D. C. CURTIS.